J. P. Rollins,
Wood Auger.
N° 13,998.   Patented Dec. 25, 1855.
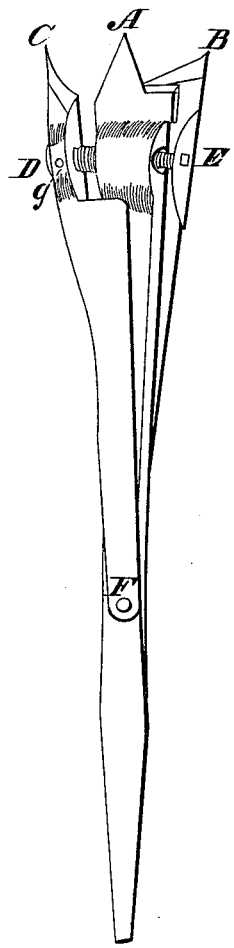

UNITED STATES PATENT OFFICE.

JOHN P. ROLLINS, OF BOSTON, MASSACHUSETTS.

EXTENSION-BIT.

Specification of Letters Patent No. 13,998, dated December 25, 1855.

*To all whom it may concern:*

Be it known that I, JOHN P. ROLLINS, of Boston, in the county of Suffolk and Commonwealth of Massachusetts, have invented a new and Improved Extension-Bit; and I do declare hereby that the following is a full and exact description of the construction and operation thereof, reference being had to the accompanying drawing and to the letters of reference marked thereon.

The figure represents a perspective view of the bit, in which—

A is the center spur and main stock.

B is the knife, or lip, for lifting the chip. The lower end of this is confined to the center stock, A, by means of the pin, F, on which it swings.

C is the cutting spur, the lower end of which is also fastened to A, by the pin, F.

The cutting parts of this bit are constructed and operate substantially like the common "center bit."

D is a large, hollow, fine-threaded screw, screwing into the main stock, A, and turning in the cutting spur, C, being kept in its place by means of a small groove and screw pin, G.

E is a small, coarse-threaded screw, fast in the lip, B, and screwing into the large hollow screw, D. The threads on E are just twice as coarse as those on D, or, instead of the coarse threads on E, there may be substituted a double-thread of the same fineness as those on D, or, again, instead of the screws, D and E, we may use a single screw one end of which is right-handed, the other left. In this latter case, of course, the threads must work in C and B, while the screw is kept from working sidewise in A, by means of a groove and pin similar to G.

It is obvious that, by turning the screw, D, the spur, C, and lip, B, will move with the same velocity either toward the center spur, A, or from it, thus rendering it extremely easy to expand the bit or contract it, with perfect accuracy and minuteness, while at the same time it is entirely secure from all liability of being knocked, or slipping, from one size to another.

I do not claim the invention of movable cutters; but

What I claim as new and desire to secure by Letters Patent, is—

The manner in which the lip and cutter are set, (or secured) for operation, when being adjusted, without the use of separate screws for that purpose, and in the manner described.

JOHN P. ROLLINS.

Witnesses:
 LALEN COFFIN,
 MAYNARD TWITCHLE.